Oct. 26, 1937.  R. A. BRADLEY  2,097,113
TANK TRUCK CONSTRUCTION
Filed June 8, 1936  4 Sheets-Sheet 1

Inventor:-
Ralph A. Bradley
By:- Cox & Moore attys

Oct. 26, 1937.   R. A. BRADLEY   2,097,113
TANK TRUCK CONSTRUCTION
Filed June 8, 1936   4 Sheets-Sheet 2
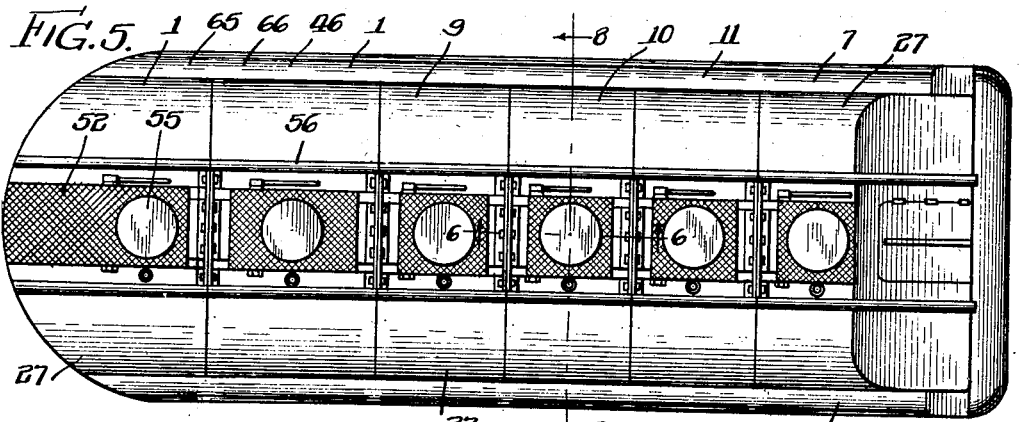
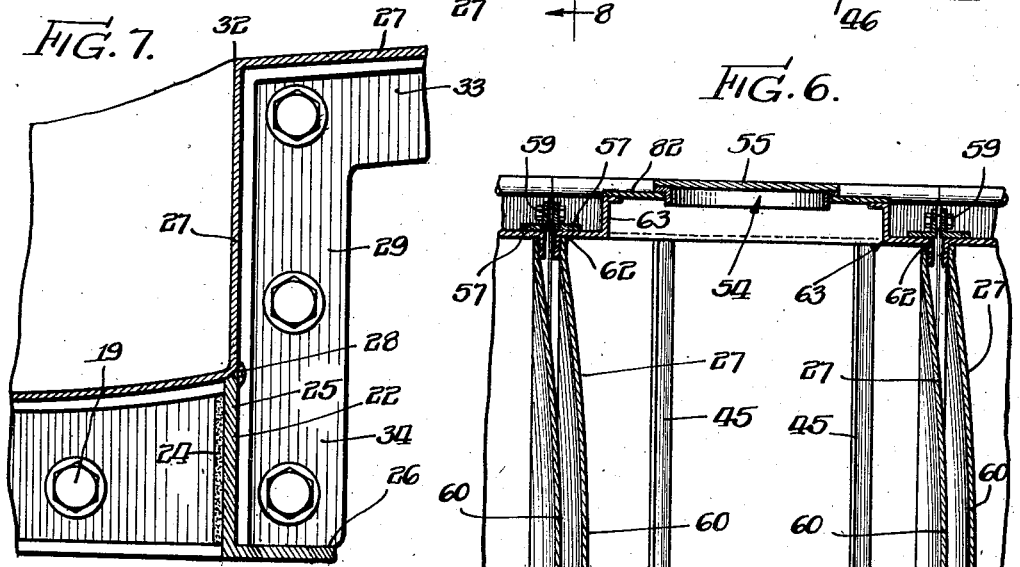
Inventor:-
Ralph A. Bradley
By:- Cox & Moore  attys.

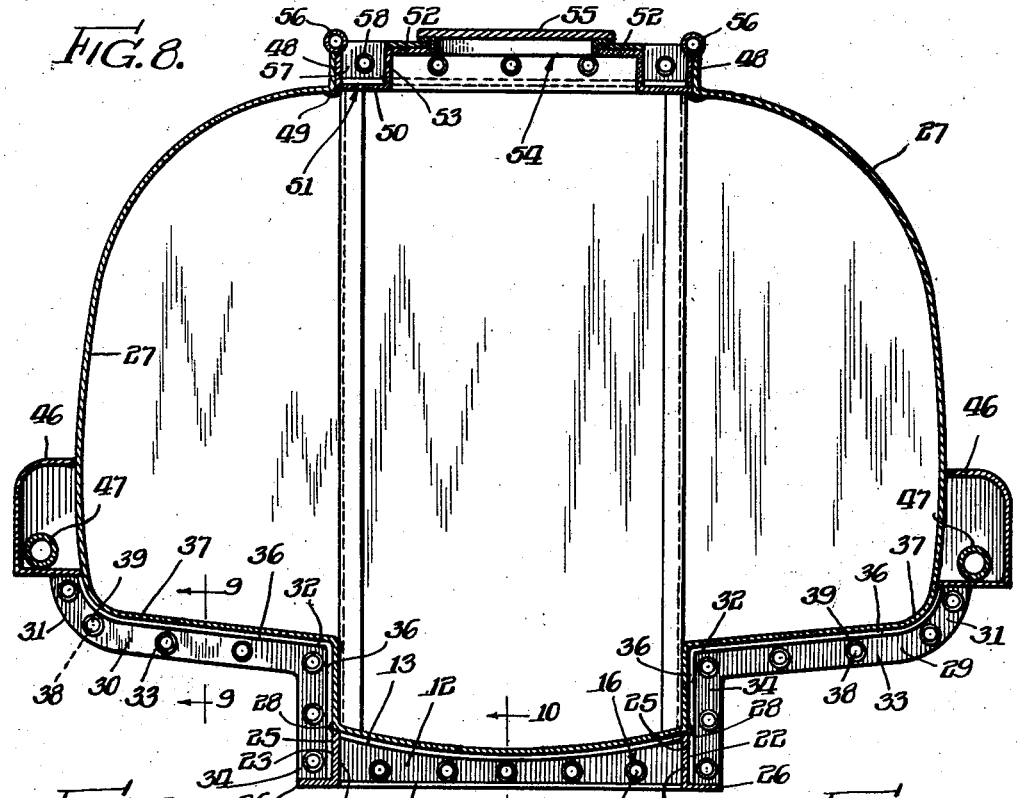

Oct. 26, 1937.   R. A. BRADLEY   2,097,113
TANK TRUCK CONSTRUCTION
Filed June 8, 1936   4 Sheets-Sheet 4

Inventor:-
Ralph A. Bradley
By:- Cox & Moore  attys

Patented Oct. 26, 1937

2,097,113

UNITED STATES PATENT OFFICE 2,097,113

TANK TRUCK CONSTRUCTION

Ralph A. Bradley, Minneapolis, Minn., assignor of one-half to Euel B. Young, Chicago, Ill.

Application June 8, 1936, Serial No. 84,053

12 Claims. (Cl. 280—5)

This invention relates to truck construction generally and particularly to a construction for tank trucks. More specifically the invention relates to a tank truck construction in which the tank portion is made in a plurality of parts.

It is well known that tank trucks have heretofore been made in a plurality of sections and joined together, but in the prior sectional tanks a supporting base or frame has always been provided whereby the plurality of sections were merely operatively connected to the frame and cradle of the truck.

The primary object of the present invention is to make a tank truck as a unit whereby a plurality of sections are removably and interchangeably connected together without the requirement of the customary frame or support. In other words, the present invention contemplates a plurality of sections adapted to be joined together whereby the sections in themselves constitute the supporting structure of the tank as well as the tank proper.

A further object of the invention is the provision of certain constructions and arrangements of parts, and the manner of applying the parts, to provide a tank structure which is a self-supporting unit.

A still further object of the invention is to provide a tank truck construction which is composed of a plurality of removable, interchangeable connected parts whereby a tank truck assembly is provided which is strong and durable in construction, which is efficient in operation and which can be readily and economically manufactured and assembled.

Numerous other objects and advantages will be apparent throughout the progress of the following specification.

The accompanying drawings illustrate a selected embodiment of the invention, and the views therein are as follows:

Fig. 5 is a detail top plan view showing a plurality of the units connected together;

Fig. 6 is a detail longitudinal sectional view on the line 6—6 of Fig. 5;

Fig. 7 is a detail sectional view on the line 7—7 of Fig. 6;

Fig. 8 is a transverse vertical sectional view on the line 8—8 of Fig. 5;

Fig. 9 is a detail sectional view on the line 9—9 of Fig. 8;

Fig. 10 is a detail sectional view on the line 10—10 of Fig. 8;

Figure 1:
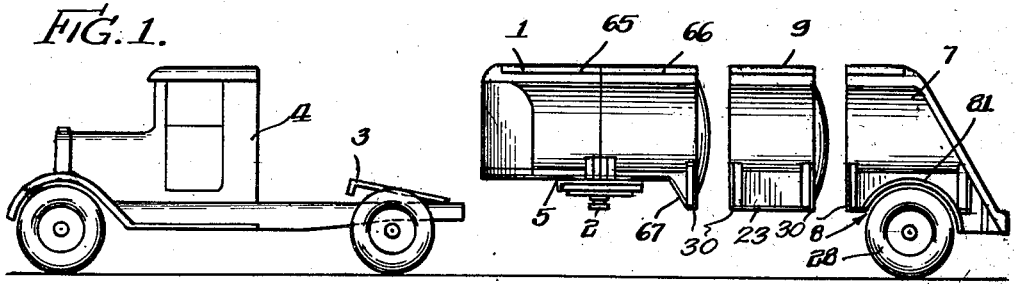
Fig. 1 is a detail, elevational view of a tank truck and its cooperating tractor, the said view showing the parts in disconnected position.
Figure 2:
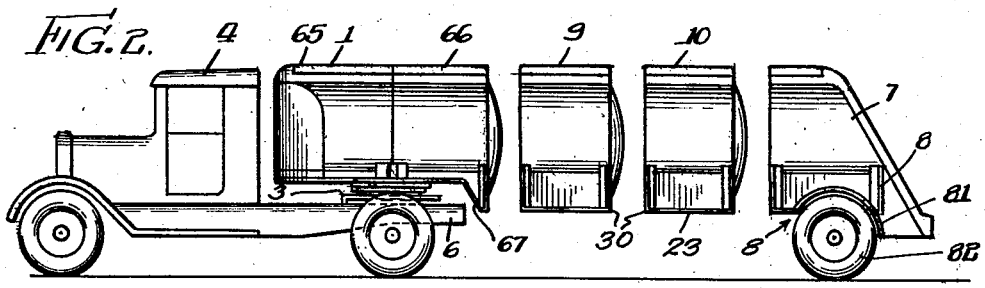
Fig. 2 is a view similar to Fig. 1, showing a tank with all the parts not connected together but showing certain parts connected to the tractor.
Figure 3:
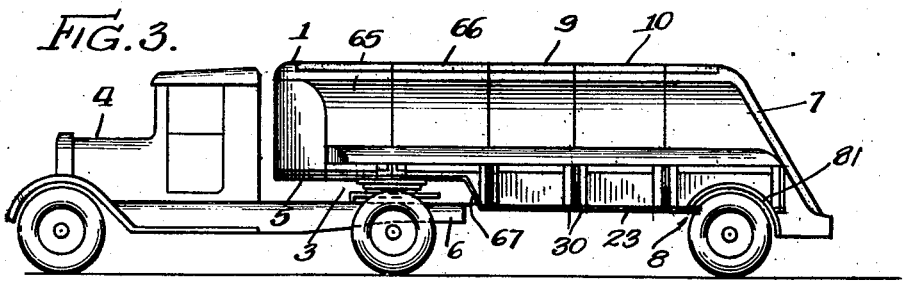
Fig. 3 is a detail view of the improved truck construction, showing the parts in assembled or connected relationship.

The particular tank truck herein shown for the purpose of illustration comprising a front section 1 having a king-pin 2 which cooperates with the fifth wheel 3 of a tractor 4. The front unit 1 is provided with a relatively straight portion 5 so as to fit over the top of the tractor frame 6.

Figure 14:
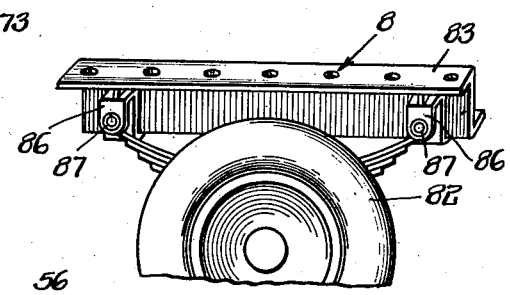
Fig. 14 is a detail elevational view showing the rear end wheel supporting structure which is fixed to the rear unit.

A rear section 7 is made of the proper and desired shape and carries a wheel truck assembly 8, Fig. 14.

Intermediate sections 9, 10 and 11 are removably, interchangeably and disconnectedly connected to and between the front section 1 and the rear section 7.

Each of the intermediate sections and the rear section comprises a bottom supporting channel 12, Figs. 8 to 10, having legs 13 extending inwardly toward the center of each unit so that the outer or back edge 14 of the channel 12 of one unit will rest against and be flush with the back or outer edge 14 of the adjacent unit, as clearly shown in Fig. 10. Each channel 12 is provided with an opening 15 which alines with a similar opening 15 in the adjacent contiguous channel. Each opening 15 is enlarged and countersunk, as indicated at 16, Fig. 10, whereby the two openings comprise an opening 17 formed within the backs 14 of each channel, when the channels are arranged back to back, to receive a wedge and shear ring 18. A bolt 19 is arranged through alined openings 15, through the shear ring 18, and receives a nut 20 for drawing the parts together. The head of the bolt 19 and the contacting surface of the nut 20 are each provided with an integral washer portion 21. The bottom channels 12 of the units are therefore tightly and rigidly but removably fastened together, and any shear occurring is transmitted to the shear ring 18 and distributed, thereby preventing direct shear against the body of the bolt.

Side angle irons 22 and 23, Fig. 8, extend longitudinally of each section and are welded along the lines 24 to the edges of the channels 12. These angles are so arranged that their vertical legs 25 extend upwardly and their horizontal legs 26 extend outwardly. Each unit also comprises a tank unit 27 which rests upon the upper leg 13 of the channel 12 and the upper edges of the legs 25 of the angles 22 and 23. The bottom portion of the tank unit 27 is welded along the longitudinal seams 28 where the upper edge of the angle legs contact with the lower part of the tank unit 27. The bottom portion of the tank, the angles 22 and 23, and the channels 12 of each unit are thus securely and rigidly connected together, Figs. 7 and 8.

Outwardly extending angles 29 and 30 are bent to conform with the bottom configuration of the tank, each having a curved portion 31 at its outer edge and an offset portion 32, whereby a relatively straight horizontal portion 33 and a vertical portion 34 are provided. The bottom edge of each of the angles 29 and 30 rests upon the upper surface of the flanges 26 of the previously described angles 22 and 23, respectively, Fig. 8. One flange 35 of the angles 29 and 30 extends downwardly and another flange or leg 36 extends longitudinally toward the center of each section and supports and strengthens the bottom of the tank 27. The flange 36 extends from the bottom of the vertical portion 34 to the upper edge of the curved portion 31 throughout the entire length of the angles 29 and 30. The angles 29 and 30 are welded along the edge 37 to make a rigid connection between the tank body 27 and the angles 29 and 30. The downwardly extending legs 35 of the angles 29 and 30 are each provided with an opening 38 which alines with a similar opening 38 in the adjacent contiguous angle. Each opening 38 is enlarged and countersunk, as indicated at 39, Fig. 9, whereby the two openings comprise an opening 40 formed within the backs 41 of each angle, when the angles are arranged back to back, to receive a wedge and shear ring 42. A bolt 43 is arranged through the alined openings 38, through the shear ring 42, and receives a nut 44 for drawing the parts together. The head of the bolt 43 and the contacting surface of the nut 44 are each provided with an integral washer portion 44'. The bottom legs of the angles are therefore tightly and rigidly but removably fastened together and any shear and tension occurring is transmitted to the shear ring 42 and distributed, thereby preventing direct shear against the body of the bolt.

The construction of the bottom frame of the intermediate units and the rear unit as shown in the drawings, and particularly in Figs. 7 and 8 thereof, comprises a flat horizontal portion which comprises the channel members 12, 22 and 23, the outwardly extending portions 33 which support the main body or overhang of each tank unit 27, and the vertical portion 34. This arrangement provides a tank frame which continues from one head to the other, and adds a great deal of stiffness to the bottom of the shell. Furthermore, the stiffness is considerably increased when the above construction includes the head stiffeners 45, Fig. 6. This arrangement provides a considerable amount of stiffness to the bottom of the shell as well as forming, when united with the head stiffeners 45, a section which is adequate to take care of the diagonal stresses. The forces set up in the tank due to its construction and its bracing are thereby handled very similar to the manner in which wind bracing is provided in high buildings.

Another advantage for the dropping of the bottom of the tank section and providing the overhang 33 on each side of the end of the bottom channels 12 is that spaces are provided for barrel carriers. These barrel carriers may be arranged under the offsets or overhangs and leave sufficient clearance without materially raising the center of gravity of the whole tank.

Figure 13:
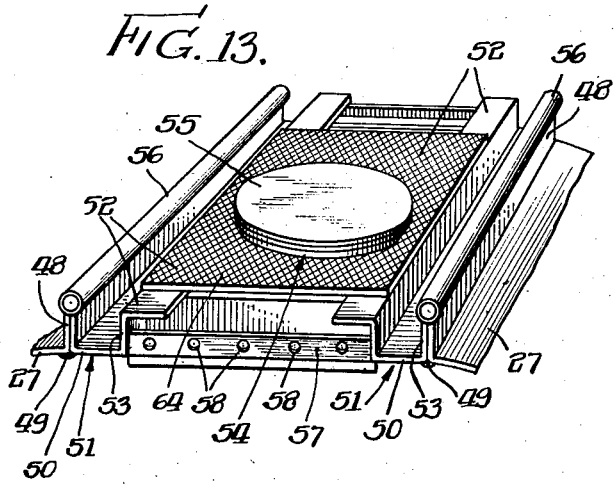
Fig. 13 is a detail perspective view of the top construction of the units.

The upper portion of the tank 27 of each intermediate unit and the rear unit terminates in an upwardly extending leg 48, Figs. 8 and 13, and has welded thereto, as indicated at 49, Fig. 8, a channel-shaped member 50 providing a pocket 51. A top cover or support 52 is welded to the leg 53 of the channel and provides a top surface for the tank. The top surface 52 of each unit is provided with an opening 54 which is closed by a removable cover 55. At the point where the outer leg of each channel 50 is connected to the outstanding leg 48 of the tank, a hand-rail 56 is suitably secured, such as by welding. Angle members 57 extend transversely across the upper surface of each tank unit 27, as clearly shown in Fig. 6. These channels 57 have their legs extending inwardly so that the back of one channel is against the back of an adjacent channel of the next contiguous unit. Alined holes 58 are provided in these transverse channels to receive fastening means 59 to lock securely the upper parts of each separate and independent tank unit. The fastening means, including the shear ring, are substantially like the fastening members and shear ring previously described with respect to the channels 12 and the angles 29 and 30. The ends of each tank unit 27 are closed by a curved or drum-shaped end 60 which is securely fastened, such as by welding, to the bottom portion of the tank, as indicated at 61, and to the upper portion of the tank, as indicated at 62, Fig. 6. At the upper edge of the tank the body is offset adjacent the opening 54, as indicated at 63, Fig. 6. The upper surface of the tank, particularly surrounding the top opening 54, is serrated as indicated at 64, Fig. 13. Instead of providing the single unitary top 52, the top may comprise an inturned leg rigidly fixed to the leg 53 of the member 50 and a separate member may be applied to the top thereof, as clearly indicated in Fig. 13.

Unit 1 preferably comprises two sections 65 and 66, Figs. 1 to 5, because of the peculiar formation of the forward portion of the tank, which must conform in general respects with the shape of the frame of the tractor 4. The construction of the sections 65 and 66 of the front unit 1 is generally similar to the construction of the intermediate and rear units, but differs therefrom as shown in Figs. 1 to 4 and 11, in that the bottom of the tank is relatively flat to conform to the shape of the tractor frame, the vertical portions 34 of the angles 29 and 30 being correspondingly shortened, and in that the rear portions of the bottom and the lower longitudinal frame members 22 and 23 of the section 66 are bent downwardly and rearwardly as indicated at 67 in Figs.

Figure 11:
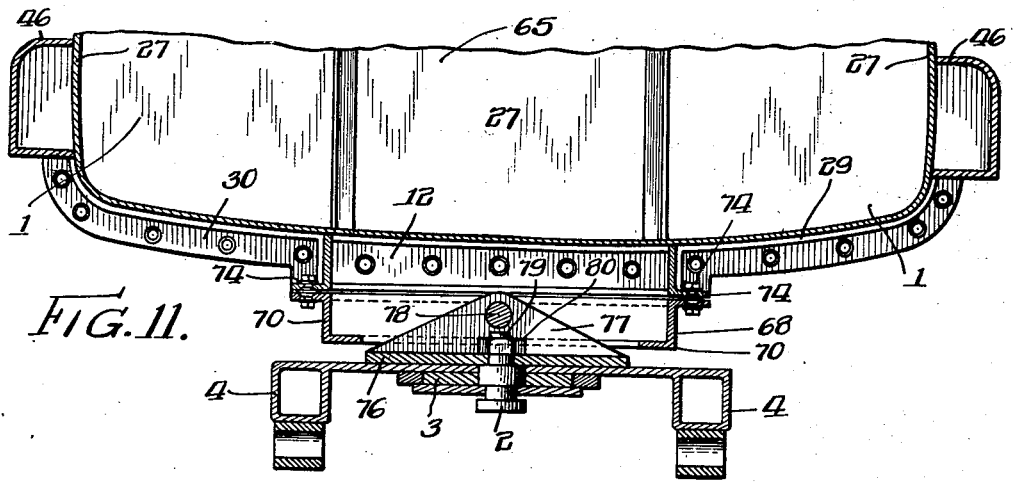
Fig. 11 is a detail sectional view on the line 11—11 of Fig. 4.
Figure 12:
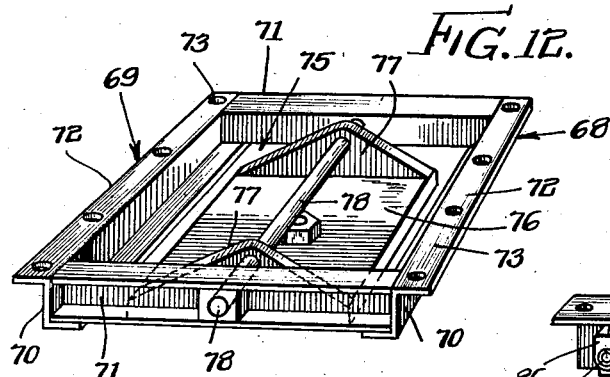
Fig. 12 is a detail perspective view of a cradle arrangement applied to the first unit of the tank truck for cooperation with the elements of the tractor.

1 to 4 and are welded to a transverse channel 12, and angles 29 and 30 to conform with the subsequent rearwardly disposed units 9, 10 and 11. The bottom of the tank and the lower frame structure of the intermediate units are below the tank bottom and frame structure of the major portion of the front unit and therefore each of said intermediate units has greater capacity than the forward unit 1. The front section 65 of the unit 1 is provided with a cradle 68, Figs. 11 and 12, which may comprise a box-shaped element designated generally by the numeral 69, Fig. 12, including side Z-bars 70 and transverse braces or supports 71. The leg 72 of each Z-bar is provided with a plurality of openings 73 which coincide with and are in alinement with the openings in the angle irons 22 and 23. Fastening means previously described, and including the shear ring, and herein designated generally by the numeral 74, Fig. 11, are provided for fastening the frame 68 to the unit 1. The bottom of the box-like structure 69 is open, as indicated generally by the numeral 75, to allow free lateral movement of a plate 76 which is pivotally supported by the transverse members 71, Fig. 12. This plate has fixed thereto upstanding end members 77 through which a supporting pin 78 passes. The king-pin 2 is rigidly fastened in any convenient manner to the plate 76, such as providing a threaded end 79 thereon and a locking nut 80, Fig. 11. The king-pin 2 cooperates with the fifth wheel 3 in any convenient conventional manner.

Figure 4:
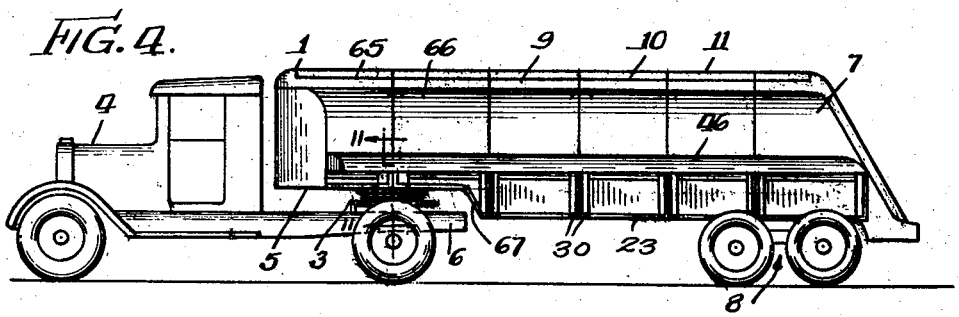
Fig. 4 is a view similar to Fig. 3, showing a tank truck comprising additional units.

The rear section 7 may be formed in any desired configuration and may include a mud guard 81 arranged over the wheels 82. The wheels and the springs and the entire rear supporting unit, including the axle, etc., may be mounted on the supporting wheel cradle 8, Fig. 14, and this supporting structure or truck may comprise side Z-bars 83 which are rigidly but removably fastened to the outturned legs 26 of the angle members 22 and 23, there being alined holes provided in the Z-bars 83 and the angle legs 26 to receive fastening means 74, previously described. Transverse cross supporting members, not shown, are operatively and rigidly fastened to the Z-bars and extend therebetween. The provision of a wheel truck 8 permits the load to be centered or placed where desired. In many instances only a pair of wheels or trucks are required, such as shown in Figs. 1, 2, 3 and 14, but if the truck is to contain additional units the truck section 8 is made considerably larger, to accommodate additional axles and wheels 82, as shown in Fig. 4.

The invention provides a tank truck construction comprising a plurality of units which are removable and interchangeable. For instance, any one of the units 9, 10 and 11 may be removed or re-positioned. Each unit is a complete, independent unit in itself and may be added to or removed from the balance of the structure. Each unit is so constructed as to be readily attachable and removable from its adjacent unit and is so constructed that it will support its own load. The method of attaching the separate units together provides a strong and rigid body element and the particular fastening means provided prevents shearing of the holding or locking bolts. Furthermore, the structure provides a relatively inexpensive construction whereby no longitudinal supporting frame is required. Each unit is independent of itself and comprises and forms its own frame. In many instances local governments are restricting the sizes of trucks. Therefore, if a person should purchase a truck of a certain length and later legislation cuts down on the length of the trucks, a unit may be taken out, and therefore the purchaser conforms with the law and still does not lose his original investment. Furthermore, a small buyer may buy a relatively small truck and then add sections or units thereto as occasion arises. The present construction is also of decided advantage because the central units 9, 10 and 11 may be made in dull season and carried in stock, as the units are interchangeable and interfitting. The particular construction for reinforcing and supporting each unit is so rigid that all danger of one unit breaking away from an adjacent unit is eliminated. If desired, strengthening struts may be provided. The struts in the present embodiment are shown in the form of channel irons and are welded to the rest of the tank as indicated at 85, Fig. 10.

Figure 15:
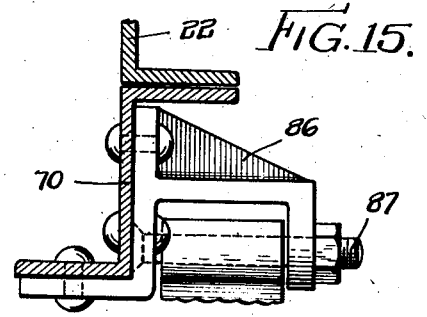
Fig. 15 is a detail sectional view showing the manner in which the spring bracket for the wheel supporting structure may be constructed.

In Fig. 15 there is shown a spring bracket construction for the wheel supporting structure. This construction may comprise a bracket 86, which may be of the conventional type, and has an angle-shaped mounting section and an outside portion or bearing that carries the outside end of the spring pin 87. The spring pin 87 goes through the outer bearing, the spring eye, the inner angle portion, and the tank frame. This spring mounting structure therefore provides a mounting for the spring which is outside of the tank frame, the brackets being cantilevered out from the frame. This spring mounting construction for the rear wheel structure is of the conventional spring hanger type which is used on tank trucks of a similar structure but which, of course, does not embody the sectional features of the present invention.

A tubular metal housing 46 may be operatively and rigidly connected to the tank such as by welding or otherwise for the purpose of receiving a hose 47.

Instead of fastening the frames, which comprise the angle and channel construction, with the specific bolt and nut fastening means previously described, these individual unit frame elements may be fastened together with rivets. It has been determined that rivets can be punched and removed about as fast as the bolts and nuts. The invention, therefore, contemplates separate, independent tank units, each having its own separate and independent supporting frame and means for fastening the frames together to provide a single unitary structure, thereby dispensing with the usual truck supporting frame which extends from one end of the truck to the other.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A tank truck construction comprising a front unit, a rear unit, and a plurality of separate, interchangeable, intermediate units, each of said units comprising a body and upper and lower frame portions, and means for detachably fastening the frame portions of adjacent units together to form a unitary self-supporting truck.

2. A tank truck construction comprising a front unit, a rear unit, and a plurality of interchangeable, intermediate units, each of said intermediate units comprising a body, lower longitudinally extending frame members secured to said body and lower laterally extending frame members secured to said lower longitudinally extending frame members and to said body adjacent opposite ends thereof, each of said front and rear units having a body and lower laterally extending frame members secured to said body at one end thereof, and means for detachably connecting said laterally extending frame members together to form a unitary tank truck.

3. In a tank truck construction, a tractor unit, a front tank unit comprising a body and a frame, said frame having secured intermediately thereof a king-pin for connecting the front unit to the tractor unit and said frame having at its rear end a lateral frame member secured thereto and depending therefrom, a rear tank unit, a plurality of interchangeable, intermediate tank units, said rear unit and each of said intermediate units comprising a body and a frame, the frames of the intermediate units having lateral frame members adjacent opposite ends thereof and the frame of the rear unit having a laterally extending frame member adjacent its forward end, and means for detachably fastening the lateral frame members of the several tank units to form an integral self-supporting tank truck construction.

4. In a tank truck construction, a tractor unit, a front tank unit comprising a body and a frame, said frame comprising a plurality of upper and lower longitudinally and laterally extending frame members, upper and lower ones of said laterally extending frame members being secured to said longitudinal frame members adjacent the rear of said front tank unit, and another of said lateral frame members being secured to the lower longitudinal frame members intermediate the ends of the body, means secured to said last mentioned lateral frame member for detachably connecting said front tank unit with said tractor unit, a plurality of interchangeable, intermediate tank units, each of said intermediate units comprising a body and a frame, said frame having longitudinally extending frame members and laterally extending frame members secured to said longitudinal frame members adjacent opposite ends thereof, a rear tank unit comprising a body and a frame, said frame comprising a plurality of upper and lower longitudinally extending frame members and a lateral frame member secured to said longitudinal frame members and to said body adjacent its forward end, and means for detachably fastening the lateral frame members of the several units to form an integral self-supporting truck.

5. In a tank truck construction, the combination of a front unit, a rear unit, and a plurality of separable intermediate units, each of said intermediate units comprising a body portion, upper and lower longitudinally extending frame members secured to said body portion and upper and lower laterally extending frame members secured to said longitudinal members and to said body portion adjacent opposite ends thereof and each of said front and rear units having a body portion, upper and lower longitudinally extending frame members secured to said body portion, and upper and lower laterally extending frame members secured to said body portion at one end thereof, means for detachably connecting said laterally extending frame members of the several units, a wheel supporting truck, and means for detachably connecting said wheel truck to the lower longitudinally extending frame members of any of the several units.

6. In a tank truck construction, the combination of a front unit, a rear unit, and a plurality of interchangeable, intermediate units, each of said units comprising a tank body and a frame, said tank body having an opening in the top surface thereof, said frame comprising upper and lower longitudinally extending frame members secured to said body portion and upper and lower laterally extending frame members, the lateral frame members of the intermediate units being secured to said body portions and said longitudinal frame members adjacent opposite ends thereof and the lateral frame members of each of the front and rear units being secured to the body portion and to the longitudinal frame members at one end thereof, a cover member and a plurality of longitudinally extending hand rails secured to the upper longitudinal frame members, and means for detachably connecting the laterally extending frame members of adjacent units together to form a unitary tank truck.

7. In a tank truck construction, the combination of a front unit, a rear unit, and a plurality of interchangeable, intermediate units, each of said units comprising a tank body and a frame, the frame of each intermediate unit comprising upper and lower longitudinally extending frame members secured to said body and upper and lower laterally extending frame members secured to said body and said longitudinal frame members adjacent opposite ends thereof and the frame of each of the front and rear units comprising upper and lower longitudinally extending frame members and laterally extending frame members secured to said longitudinal members adjacent one end of the body, means for detachably connecting the laterally extending frame members of adjacent units together to form a unitary tank truck, and a tubular metal housing connected to each of opposite sides of said tank and extending substantially throughout the complete length of the assembled truck.

8. A truck construction comprising a front unit, a rear unit, and an intermediate unit, each of said units comprising a body and upper and lower frame portions and means for detachably fastening the frame portions of the intermediate unit to the front and rear units, to form a unitary self-supporting truck.

9. A tank truck construction comprising a front unit, a rear unit, and an intermediate unit, each of said units comprising a tank body, upper and lower angle members secured to and extending longitudinally of said body, upper and lower laterally extending channel members, lower laterally and vertically extending angle members, said channel members and said last mentioned angle members being secured to said body and to said longitudinal angle members at opposite ends of the body of the intermediate unit and at the rear and front ends, respectively, of the body of the front and rear units and means for detachably connecting the laterally extending channel members and the lower laterally and vertically extending angle members of adjacent units to form an integral, self-supporting tank truck.

10. A tank truck construction comprising a front unit, a rear unit, and an intermediate unit, each of said units comprising a tank body, upper and lower angle members secured to and extending longitudinally of said body, upper and lower laterally extending channel members, lower laterally and vertically extending angle members, said channel members and said last mentioned angle members being secured to said body and to said longitudinal angle members at opposite ends of the body of the intermediate unit and at the rear and front ends, respectively, of the body of the front and rear units, means for detachably connecting the laterally extending channel members and the lower laterally and vertically extending angle members of adjacent units to form an integral, self-supporting tank truck, and tubular metal housings mounted on each of opposite sides of said tank and secured to said vertically extending angle members.

11. A vehicle construction comprising a front unit and a rear unit, each of said units comprising a body having a top portion, side portions and a bottom portion, upper and lower angle members secured to and extending longitudinally of said top and bottom portions of the body, upper and lower laterally extending channel members secured at their opposite ends to said longitudinal members and secured to said top and bottom portions of the body at opposite ends thereof, additional angle members supported by the lower longitudinal angle members at the rear and front ends respectively of the body of the front and rear units, each of said additional angle members having a substantially horizontal portion extending outwardly from a longitudinal member and being secured to the bottom portion of the body and a vertical portion extending downwardly from the horizontal portion and engaging a longitudinal member, shear bolts for detachably connecting the laterally extending channel members at the rear and front ends of the front and rear units, respectively, and additional shear bolts for detachably connecting the additional angle members whereby to form an integral self-supporting vehicle construction.

12. In a tank truck construction, a tractor having a substantially flat frame portion, a rear unit comprising a tank body having a top portion, outwardly bowed side portions and a bottom portion having a depending central section, upper and lower angle members secured to and extending longitudinally of the top portion and the depending section of the bottom portion of said body, upper and lower laterally extending channel members secured to said top portion, to said depending section of the bottom portion of said body, and to said longitudinal members at opposite ends thereof, additional angle members supported by the lower longitudinal angle members at opposite ends thereof, said additional angle members having outer curved portions secured to and supporting the outwardly bowed side portions of the tank body, intermediate portions secured to and supporting the bottom portion outwardly of the depending section, and vertical portions secured to the depending section of the bottom portion, a front unit comprising a tank body having a top portion and outwardly bowed side portions conforming to the top and side portions of the body of the rear unit and a substantially flat bottom portion having a depending central section at its rear end to conform to the central depending section of the body of the rear unit, upper and lower angle members secured to and extending longitudinally of the top and bottom portions of said body, upper and lower laterally extending channel members secured to said longitudinal members and to the top and bottom portions of said body at opposite ends thereof, additional angle members supported by the lower longitudinal angle members at the rear end of said body, said additional angle members having outer curved portions secured to and supporting the outwardly bowed side portions of the body, intermediate portions secured to and supporting the bottom portion outwardly of the depending central section and vertical portions secured to said depending central section of the body, means for detachably connecting the adjacent upper and lower laterally extending channel members and additional angle members to form an integral self-supporting tank truck and means carried by the lower longitudinal angle members intermediately the ends of the front unit for connecting said unit to said tractor.

RALPH A. BRADLEY.